US006674194B2

(12) United States Patent
Asao

(10) Patent No.: US 6,674,194 B2
(45) Date of Patent: Jan. 6, 2004

(54) AUTOMOTIVE ALTERNATOR

(75) Inventor: Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 19 days.

(21) Appl. No.: 10/286,839

(22) Filed: Nov. 4, 2002

(65) Prior Publication Data

US 2003/0102735 A1 Jun. 5, 2003

Related U.S. Application Data

(62) Division of application No. 09/846,378, filed on May 2, 2001, now Pat. No. 6,528,912.

(30) Foreign Application Priority Data

Oct. 20, 2000 (JP) ....................................... 2000-320952

(51) Int. Cl.[7] ................................................ H02K 11/00
(52) U.S. Cl. .......................... 310/68 D; 310/71; 310/64
(58) Field of Search ................................ 310/68 D, 71, 310/64, 89, 256, 261

(56) References Cited

U.S. PATENT DOCUMENTS 4,683,390 A 7/1987 Imori et al.
5,710,467 A * 1/1998 Irie et al. ....................... 310/64
5,977,669 A * 11/1999 Yoshida et al. ........... 310/68 D

FOREIGN PATENT DOCUMENTS

| | | |
|---|---|---|
| JP | 2511014 | 6/1996 |
| JP | 9-107654 | 4/1997 |

* cited by examiner

*Primary Examiner*—Thanh Lam
(74) *Attorney, Agent, or Firm*—Sughrue Mion, PLLC

(57) ABSTRACT

An automotive alternator secures a fastening force for a vehicular connecting terminal for an extended period of time, and restricts the axial displacement of an output terminal, thus ensuring higher reliability. The output terminal is press-fitted and secured in a through hole in a first cooling plate, and the takeout end thereof is drawn out of an opening of a rear bracket. A metal bush is loosely inserted in an insulating bush and externally fitted to the output terminal, and the vehicular connecting terminal is fasteningly secured to the metal bush by a nut. With this arrangement, the fastening force of the nut is received by the rear surface of the first cooling plate via the metal bush. A flange of the metal bush is positioned so that a gap is provided between the flange and the insulating bush. The axial displacement of the output terminal is restricted by the flange abutting against the insulating bush.

4 Claims, 7 Drawing Sheets

12A 26B 26a 125 137 122 134 130 27 27a 123 138 2b 2 42 41 50 26d 44 26f 26e

F I G. 8
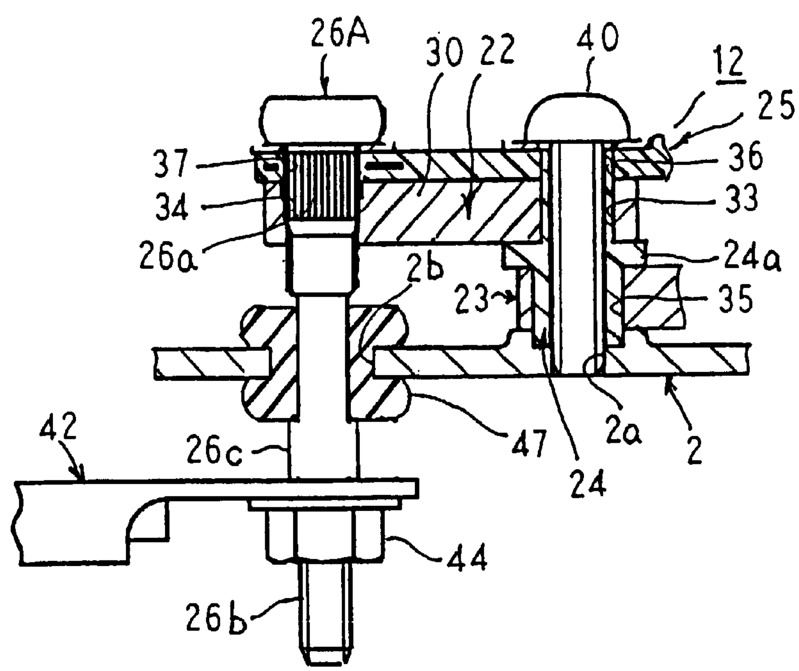

AUTOMOTIVE ALTERNATOR

This is a divisional of application Ser. No. 09/846,378 now 6,528,912 filed May 2, 2001; the disclosure of which is incorporated herein by reference.

This application is based on Application No. 2000-320952, filed in Japan on Oct. 20, 2000, the contents of which are hereby incorporated by reference.

BACKGROUND OF THE INVENTION

1. Field of the Invention

The present invention relates to an automotive alternator and, more particularly, to an assembly structure of a rectifying unit for an automotive alternator.

2. Description of the Related Art

FIG. 11 is a perspective view showing a conventional rectifying unit applied to an automotive alternator. FIG. 12 is a sectional view of an essential section for explaining the conventional rectifying unit, which has been installed.

Referring to FIG. 11 and FIG. 12, a rectifying unit 120 includes a plurality of positive-electrode-side diodes 20 and negative-electrode-side diodes 21 for carrying out full-wave rectification on three-phase alternating current, a first cooling plate 122 and a second cooling plate 123 for cooling the positive-electrode-side diodes 20 and the negative-electrode-side diodes 21, respectively, insulators 24 and 27 for insulating the first and second cooling plates 122 and 123, a circuit board 125, and an output terminal 26. The positive-electrode-side diode 20 and the negative-electrode-side diode 21 constitute a first diode and a second diode, respectively.

The first cooling plate 122 is shaped like a horseshoe, and has the positive-electrode-side diodes 20 arranged on a main surface 122*a* thereof in the circumferential direction. A radiating fin 122*b* is vertically installed from the rear surface of the first cooling plate 122, that is, the surface opposing the main surface. Three flanges 130, 131, 132 are provided at both ends and the middle, respectively, in the circumferential direction of the first cooling plate 122. All the flanges 130, 131, and 132 are raised from a main surface 101*a* of the first cooling plate 101, and extended outward in the radial direction. An output terminal insertion through hole 134 is provided in the radially extended end of the flange 130 provided at one circumferential end of the first cooling plate 122. Mounting screw insertion through holes 133 are provided in the radially extended ends of the remaining flanges 131 and 132.

The second cooling plate 123, which is also shaped like a horseshoe, has a larger diameter than that of the first cooling plate 122, and has the negative-electrode-side diodes 21 arranged on a main surface 123*a* thereof in the circumferential direction. Furthermore, one output terminal insertion through hole 138, and two mounting screw insertion through holes 135 are provided at both ends and the middle in the circumferential direction of the second cooling plate 123 such that they align with the output terminal insertion through hole 134 and the mounting screw insertion through holes 133 provided in the first cooling plate 122, respectively.

The circuit board 125 is a resinous molding having insert-molded wiring for constituting diode bridges for the positive-electrode-side diodes 20 and the negative-electrode-side diodes 21, and horseshoe-shaped like the second cooling plate 123. Furthermore, one output terminal insertion through hole 137 and two mounting screw insertion through holes 136 are provided at both ends and the middle in the circumferential direction of the circuit board 125 such that they align with the output terminal insertion through hole 134 and the mounting screw insertion through holes 133 provided in the first cooling plate 122, respectively.

Each of the cylindrically shaped insulators 24 is made of, for example, a phenol resin, and has a flange 24*a* in the central portion of the outer periphery thereof. The cylindrically shaped insulator 27 is made of, for example, a phenol resin, and has a flange 27*a* at one end portion thereof. The output terminal 26 has a knurl groove portion 26*a* provided at the counter-takeout side and an external thread portion 26*b* provided at the takeout side.

The rectifying unit 120 is assembled as described below. First, the insulators 24 are inserted in the mounting screw insertion through holes 135 of the second cooling plate 123 such that the flanges 24*a* are in contact with the main surface 123*a*. Similarly, the insulator 27 is inserted in the output terminal insertion through hole 138 of the second cooling plate 123 such that the flange 27*a* is in contact with the main surface 123*a*. Then, the first cooling plate 122 is disposed such that the insulators 24 are inserted in the mounting screw insertion through holes 133. This concentrically arranges the first and second cooling plates 122 and 123, respectively, with their main surfaces 122*a* and 123*a* being flush with each other, and the positive-electrode-side diodes 20 and the negative-electrode-side diodes 21 facing each other. The circuit board 125 is stacked on the main surface 123*a* of the second cooling plate 123 such that the insulators 24 are inserted in the mounting screw insertion through holes 136. Thus, connecting terminals 125*a* of the circuit board 125 are held between terminals 20*a* and 21*a* of the opposing positive-electrode-side and negative-electrode-side diodes 20 and 21, respectively, and joined by soldering. Subsequently, the output terminal 26 is inserted from the output terminal insertion through hole 137 of the circuit board 125 into the output terminal insertion through holes 134 and 138 of the first and second cooling plates 122 and 123, respectively. Lastly, the knurl groove portion 26*a* of the output terminal 26 is press-fitted into the output terminal insertion through hole 134 of the first cooling plate 122 to electrically connect the output terminal 26 and the first cooling plate 122, completing the assembly of the rectifying unit 120 shown in FIG. 11.

In the rectifying unit 120 assembled as described above, a mounting screw 40 inserted in the mounting screw insertion through holes 133, 135, and 136 is fastened into a tapped hole 2*a* provided in a rear bracket 2 so as to fasten together the first and second cooling plates 122 and 123, and the circuit board 125, as illustrated in FIG. 12. The takeout end of the output terminal 26 connected to the first cooling plate 122 is extended out of an opening 2*b* provided in the rear bracket 2. An output terminal fastening nut 50 threaded to the external thread portion 26*b* of the output terminal 26 is fastened thereby to fasten together an insulating bush 41 formed of a phenol resin mounted on the opening 2*b* of the bracket 2, the first and second cooling plates 122 and 123, and the circuit board 125 onto the rear bracket 2.

To join a vehicular connecting terminal 42 to the output terminal 26, the connecting terminal 42 is externally fitted to the takeout end of the output terminal 26, and a nut 44 is screwed onto the external thread portion 26*b*. Then, the nut 44 is tightened to fasteningly secure the connecting terminal 42 to the outer end surface of the nut 50. In this case the outer end surface of the output terminal fastening nut 50 serves as a fastening seat.

The first and second cooling plates 122 and 123, the circuit board 125, and the insulating bush 41 are secured together to the rear bracket 2 by the fastening force of the output terminal fastening nut 50. With this arrangement, even if the vibration caused by a weight, such as a harness, is transmitted from the vehicle to the vehicular connecting terminal 42, the output terminal 26 will not be displaced in the axial direction, thus initially preventing damage or the like to the rectifying unit 120. Moreover, since the fastening force of the nut 44 is received by the outer end surface of the output terminal fastening nut 50 making up the fastening seat, the fastening force for the vehicular connecting terminal 42 is initially secured.

In the conventional automotive alternator, since the rectifying unit 120 is assembled and installed as set forth above, when power is generated by the automotive alternator, large current passes the vehicular connecting terminal 42, generating heat. The generated heat is conducted from the nut 50 to the insulating bush 41, and the insulating bush 41 becomes hot. This has been posing a problem in that the insulating bush 41 develops thermal degradation and shrinks. The shrinkage of the insulating bush 41 causes loose fastening by the output terminal fastening nut 50, allowing the output terminal 26 to be displaced in the axial direction. As a result, if the vibration of a weight, such as a harness, from a vehicle is transmitted to the vehicular connecting terminal 42, the output terminal 26 is displaced in the axial direction. This has been giving a rise to a problem in that the rectifying unit 120 may be damaged or the fastened portion of the mounting screw 40 may break, with consequent degraded reliability.

If the output terminal fastening nut 50 loosens, then the connecting terminal 42 fastened by the nut 44 accordingly becomes loose. This causes markedly increased heat generation at the fastened portion of the connecting terminal 42, adding to the shrinkage of the insulating bush 41 attributed to thermal degradation. Hence, the output terminal 26 tends to be axially displaced more readily, leading to a problem in that the rectifying unit 120 is damaged or the fastened portion of the mounting screw 40 breaks more easily due to the vibrations caused by a weight, such as a harness, from a vehicle, resulting in degraded reliability.

Furthermore, the fastening force of the nut 44 is received by the output terminal fastening nut 50 pushing the insulating bush 41, posing a problem in that the vibration of a weight, such as a hardness, from a vehicle is repeatedly applied to the insulating bush 41 via the nut 50, causing the insulating bush 41 to develop a creep. The creep of the insulating bush 41 in turn leads to loose fastening by the output terminal fastening nut 50, giving a rise to the problem described above.

SUMMARY OF THE INVENTION

Accordingly, the present invention has been made with a view toward solving the problems described above, and it is an object of the present invention to provide an automotive alternator having an axial displacement restricting member for restricting the axial displacement of an output terminal connected to a first cooling plate of a rectifying unit, wherein a fastening seat for fastening a vehicular connecting terminal is provided at a takeout end of the output terminal to restrain damage to the rectifying unit attributable to the axial displacement of the output terminal and to restrain heat generation attributable to loosening of a fastened portion of the vehicular connecting terminal, thereby achieving improved reliability of the automotive alternator.

It is another object of the present invention to provide an automotive alternator wherein a fastening seat for fastening a vehicular connecting terminal, which is irrelevant to a fixing device, is provided at a takeout end of an output terminal by which first and second cooling plates of a rectifying unit are secured to a bracket, thereby restraining heat generation attributable to loosening of a fastened portion of the vehicular connecting terminal so as to achieve improved reliability of the automotive alternator.

To these ends, according to one aspect of the present invention, there is provided an automotive alternator including a rotor rotatably supported in a metal bracket, a stator secured to the bracket such that it is located around the outer periphery of the rotor to surround the rotor, a rectifying unit having a first cooling plate on which a plurality of first diodes are provided, and a second cooling plate on which a plurality of second diodes of the opposite polarity from that of the first diodes are provided, the second cooling plate being electrically connected to the bracket, and the first and second cooling plates being secured to an inner wall surface of the bracket, a resinous insulating bush mounted at an opening provided in the bracket, an output terminal which is electrically connected to the first cooling plate, loosely inserted in the insulating bush, and taken out of the bracket, a vehicular connecting terminal being connected to the takeout end of the output terminal, an axial displacement restricting member which engages the insulating bush thereby to restrict the axial displacement of the output terminal, and constitutes a fastening seat, and an external thread portion provided on the takeout end of the output terminal, wherein the counter-takeout end of the output terminal is secured to the first cooling plate, and the vehicular connecting terminal is fasteningly secured to the fastening seat of the axial displacement restricting member by a nut threadably attached to the external thread portion.

Preferably, an elastic member is interposed between the axial displacement restricting member and the insulating bush.

Preferably, the insulating bush is mounted at the opening of the bracket such that it is abutted against the axial displacement restricting member, and the insulating bush is formed of an elastic material.

Alternatively, the axial displacement restricting member is externally fitted to the output terminal, and composed of a cylindrical metal bush having a flange of a large diameter on one end thereof, one end surface of the metal bush abuts against the vehicular connecting terminal, and the other end surface thereof abuts against the first cooling plate, and the flange thereof engages the insulating bush to restrain the axial displacement of the output terminal when the vehicular connecting terminal is connected to the takeout end of the output terminal.

Alternatively, the axial displacement restricting member is constructed by a metal bush fastening nut threadably attached to the external thread portion of the output terminal, a cylindrical metal bush which is externally fitted to the output terminal and fasteningly secured to the first cooling plate by the metal bush fastening nut, the vehicular connecting terminal is fasteningly secured to the outer end surface of the metal bush fastening nut by the nut threadably attached to the external thread portion, and the inner end surface of the metal bush fastening nut engages the insulating bush thereby to restrain the axial displacement of the output terminal.

Preferably, the axial displacement restricting member is constituted by a large-diameter flange formed at the proximal end of the external thread portion of the output terminal, the vehicular connecting terminal is fasteningly secured to the outer end surface of the flange by the nut threadably attached to the external thread portion, and the inner end surface of the flange engages the insulating bush thereby to restrain the axial displacement of the output terminal.

Preferably, a support wall is vertically provided such that it opposes the counter-takeout end surface of the output terminal, and an insulating member is interposed between the support wall and the counter-takeout end surface of the output terminal.

According to another aspect of the present invention, there is provided an automotive alternator including a rotor rotatably supported in a metal bracket, a stator secured to the bracket such that it is located around the outer periphery of the rotor to surround the rotor, a rectifying unit having a first cooling plate on which a plurality of first diodes are provided, and a second cooling plate on which a plurality of second diodes of the opposite polarity from that of the first diodes are provided, the second cooling plate being electrically connected to the bracket, and the first and second cooling plates being secured to an inner wall surface of the bracket, a resinous insulating bush mounted at an opening provided in the bracket, an output terminal which is electrically connected to the first cooling plate, loosely inserted in the insulating bush, and taken out of the bracket, a vehicular connecting terminal being connected to the takeout end of the output terminal, through holes which are provided in the first and second cooling plates and in which the output terminal is inserted, an external thread portion provided on the takeout end of the output terminal, an output terminal fastening nut threadably attached to the external thread portion to fasteningly secure the output terminal to the bracket, and a fastening seat provided at a position different from that of the output terminal fastening nut on the takeout end of the output terminal, wherein the counter-takeout end of the output terminal is inserted in the through holes of the first and second cooling plates and secured to the first cooling plate, the first and second cooling plates are secured together with the insulating bush to the bracket by the output terminal fastening nut, and the vehicular connecting terminal is fasteningly secured to the fastening seat by a nut threadably attached to the external thread portion.

Preferably, the external thread portion of the output terminal is composed of a first external thread portion having a large diameter to which the output terminal fastening nut is threadably attached and a second external thread portion having a small diameter which is continuously formed at the takeout end of the first external thread portion and to which the nut is threadably attached, and a stepped portion formed in the area, where the first and second external thread portions are connected, constitutes the fastening seat.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 8 is a sectional view of an essential section illustrating an output takeout structure in the automotive alternator according to a sixth embodiment of the present invention;

FIG. 11 is a perspective view showing a rectifying unit applied to a conventional automotive alternator; and FIG. 12 is a sectional view of an essential section illustrating an output takeout structure in the conventional automotive alternator.

DESCRIPTION OF THE PREFERRED EMBODIMENTS

The following will describe the embodiments of the present invention in conjunction with the accompanying drawings.

First Embodiment

Figure 1:
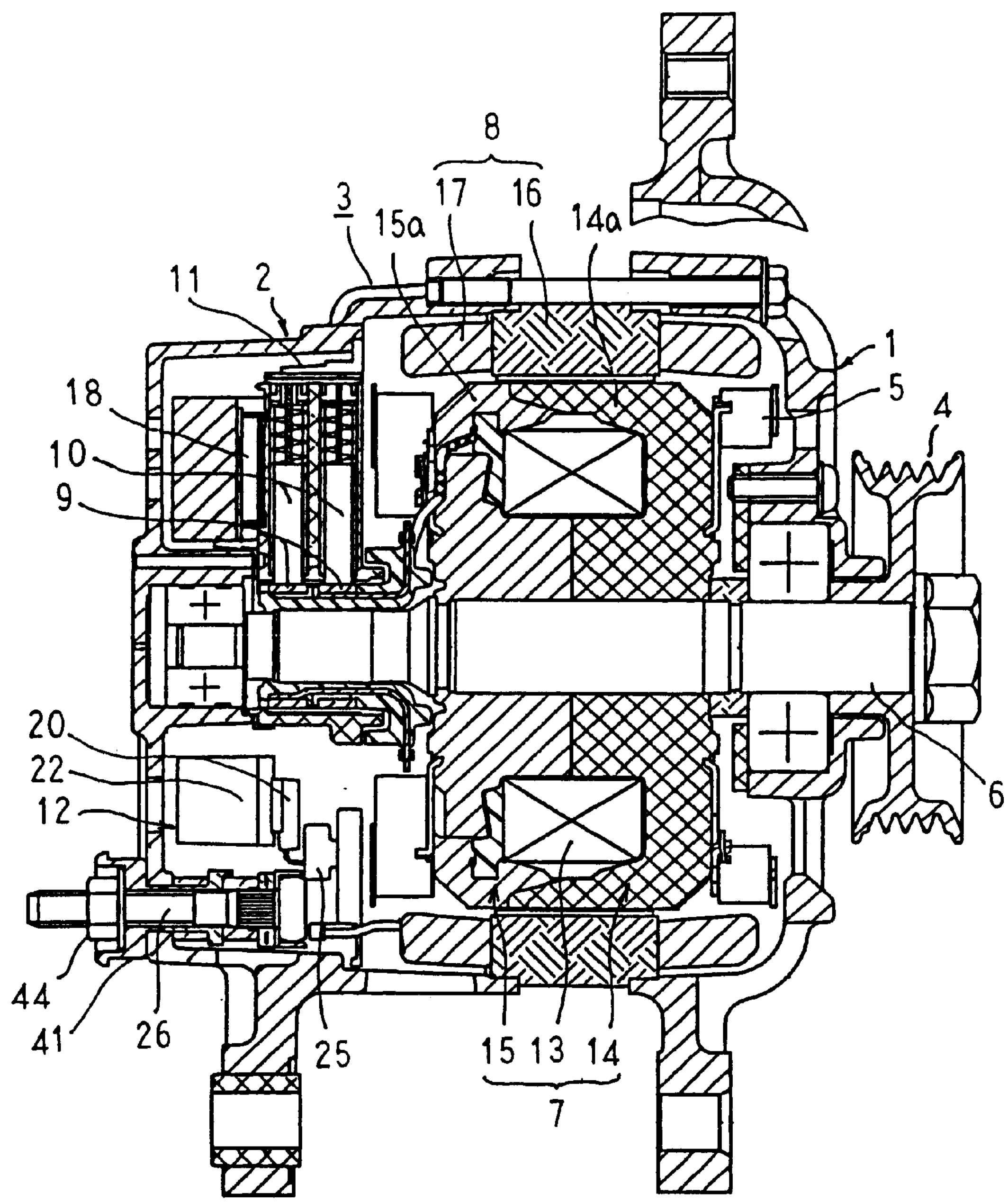
FIG. 1 is a sectional view showing an automotive alternator according to a first embodiment of the present invention.
Figure 2:
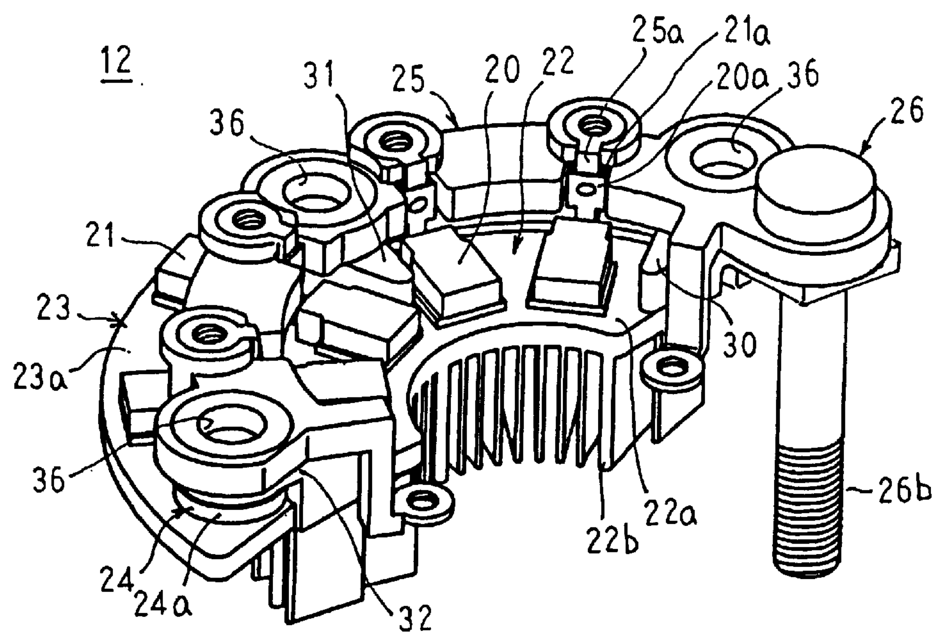
FIG. 2 is a perspective view showing a rectifying unit applied to the automotive alternator according to the first embodiment of the present invention.
Figure 3:
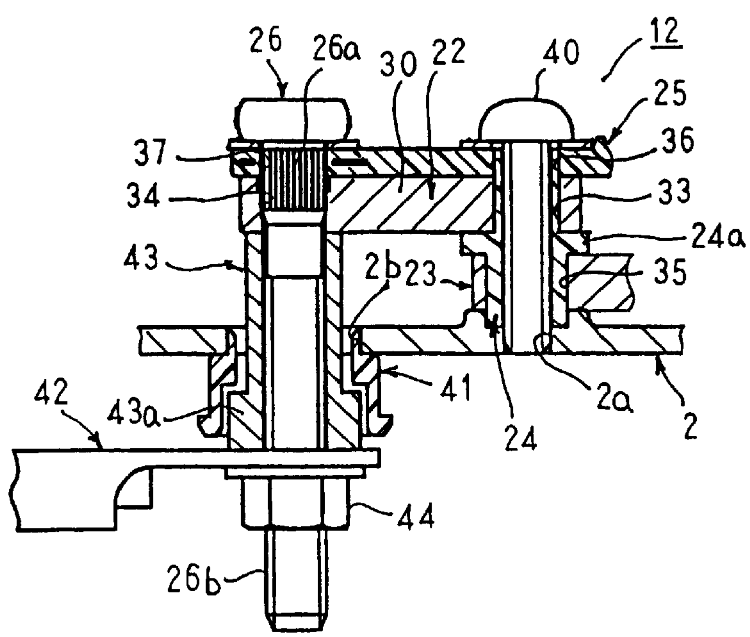
FIG. 3 is a sectional view of an essential section illustrating an output takeout structure in the automotive alternator according to the first embodiment of the present invention.

FIG. 1 is a sectional view showing an automotive alternator according to a first embodiment of the present invention. FIG. 2 is a perspective view showing a rectifying unit applied to the automotive alternator according to the first embodiment of the present invention. FIG. 3 is a sectional view of an essential section illustrating an output takeout structure in the automotive alternator according to the first embodiment of the present invention.

Referring to the FIGS. 1 through 3, the automotive alternator is constituted by a case 3 composed of a front bracket 1 and a rear bracket 2 made of aluminum, a shaft 6, which is provided in the case 3 and has a pulley 4 secured to one end thereof, a Lundell-type rotor 7 secured to the shaft 6, fans 5 secured to both axial ends of the rotor 7, a stator 8 secured to the case 3 such that it surrounds the rotor 7, slip rings 9 secured to the other end of the shaft 6 to supply electric current to the rotor 7, a pair of brushes 10 sliding on the surface of the slip rings 9, a brush holder 11 accommodating the brushes 10, a rectifying unit 12 electrically connected to the stator 8 to rectify the alternating current generated at the stator 8 into direct current, and a regulator 18 which is fitted to the brush holder 11, and adjusts the magnitude of the AC voltage generated at the stator 8.

The rotor 7 includes a field coil 13 generating magnetic fluxes upon passage of electric current, and a pair of pole cores 14 and 15 which are provided such that they cover the field coil 13, magnetic poles being formed into the pole cores 14 and 15 by the magnetic fluxes. The pair of pole cores 14 and 15 has claw-shaped magnetic poles 14*a* and 15*a* that are made of iron, have substantially trapezoidal outermost diametral surfaces, and are protuberantly provided on the outer peripheral edge portions thereof at equiangular pitches. The pair of pole cores 14 and 15 is secured to the shaft 6 such that the claw-shaped magnetic poles 14*a* and 15*a* are opposed to engage each other.

The stator 8 is constructed by a cylindrical stator iron core 16 composed of laminated magnetic steel plates, and a stator winding 17 wound about the stator iron core 16. The stator 8 is clamped by the front bracket 1 and the rear bracket 2 such that a uniform air gap is formed between the outer peripheral surfaces of the claw-shaped magnetic poles 14*a* and 15*a* and the inner peripheral surface of the stator iron core 16.

Referring to FIG. 2, the rectifying unit 12 is constructed by a plurality of positive-electrode-side diodes 20 and negative-electrode-side diodes 21 for carrying out full-wave rectification on three-phase alternating current, a first cooling plate 22 and a second cooling plate 23 for cooling the positive-electrode-side diodes 20 and the negative-electrode-side diodes 21, respectively, insulators 24 for insulating the first and second cooling plates 22 and 23, a circuit board 25, and an output terminal 26.

The first cooling plate 22 is shaped like a horseshoe, and has the positive-electrode-side diodes 20 arranged on a main surface 22*a* thereof in the circumferential direction. A radiating fin 22*b* is vertically installed from the rear surface of the first cooling plate 22, that is, the surface on the opposite side from the main surface. Three flanges 30, 31, and 32 are provided at both ends and the middle, respectively, in the circumferential direction of the first cooling plate 22. The flange 30 provided at one circumferential end of the first cooling plate 22 is raised from the main surface 22*a* of the first cooling plate 22, then extended outward in the radial direction and also extended outward in the circumferential direction. A mounting screw insertion through hole 33 is provided at the radially extended end thereof, and an output terminal insertion through hole 34 is provided in the circumferentially extended end thereof. The remaining flanges 31 and 32 are raised from the main surface 22*a* of the first cooling plate 22, then extended outward in the radial direction, and mounting screw insertion through holes (not shown) are provided in the radially extended ends thereof.

The second cooling plate 23, which is also shaped like a horseshoe, has a larger diameter than that of the first cooling plate 22, and has the negative-electrode-side diodes 21 arranged on a main surface 23*a* thereof in the circumferential direction. Furthermore, three mounting screw insertion through holes 35 are provided at both ends and the middle in the circumferential direction of the second cooling plate 23 such that they align with the mounting screw insertion through holes 33 provided in the first cooling plate 22.

The circuit board 25 is a resinous molding having insert-molded wiring for constituting diode bridges for the positive-electrode-side diodes 20 and the negative-electrode-side diodes 21, and horseshoe-shaped like the second cooling plate 23. Three mounting screw insertion through holes 36 are provided at both ends and the middle in the circumferential direction of the circuit board 25 such that they align with the mounting screw insertion through holes 33 provided in the first cooling plate 22, respectively. Furthermore, an output terminal insertion through hole 37 is provided in one circumferential end of the circuit board 25 such that it aligns with the output terminal insertion through hole 34 provided in the first cooling plate 22.

Each of the cylindrically shaped insulators 24 is made of, for example, a phenol resin, and has a flange 24*a* in the central portion of the outer periphery thereof. The output terminal 26 has a knurl groove portion 26*a* provided at the counter-takeout side and an external thread portion 26*b* provided at the takeout side.

The rectifying unit 12 is assembled as described below. First, the insulators 24 are inserted in the mounting screw insertion through holes 35 of the second cooling plate 23 such that the flanges 24*a* are in contact with the main surface 23*a*. Then, the first cooling plate 22 is disposed such that the insulators 24 are inserted in the mounting screw insertion through holes 33. This concentrically arranges the first and second cooling plates 22 and 23, respectively, with their main surfaces 22*a* and 23*a* being flush with each other, and the positive-electrode-side diodes 20 and the negative-electrode-side diodes 21 facing each other. The circuit board 25 is stacked on the main surface 23*a* of the second cooling plate 23 such that the insulators 24 are inserted in the mounting screw insertion through holes 36. Thus, connecting terminals 25*a* of the circuit board 25 are held between terminals 20*a* and 21*a* of the opposing positive-electrode-side and negative-electrode-side diodes 20 and 21, respectively, and joined by soldering. Subsequently, the output terminal 26 is inserted from the output terminal insertion through hole 37 of the circuit board 25 into the output terminal insertion through holes 34 of the first cooling plates 22. Lastly, the knurl groove portion 26*a* of the output terminal 26 is press-fitted into the output terminal insertion through hole 34 of the first cooling plate 22 to electrically connect the output terminal 26 and the first cooling plate 22, thus completing the assembly of the rectifying unit 12 shown in FIG. 2.

In the rectifying unit 12 assembled as described above, a mounting screw 40 inserted in the mounting screw insertion through holes 33, 35, and 36 is fastened into a tapped hole 2*a* provided in a rear bracket 2 so as to fasten together the first and second cooling plates 22 and 23, and the circuit board 25, as illustrated in FIG. 3. The takeout end of the output terminal 26 connected to the first cooling plate 22 is extended out of an opening 2*b* provided in the rear bracket 2. An insulating bush 41 formed of a phenol resin is mounted at the opening 2*b*.

To join a vehicular connecting terminal 42 to the output terminal 26, a cylindrical metal bush 43 is first loosely inserted in the insulating bush 41 from the takeout end of the output terminal 26 and externally fitted to the output terminal 26, then the connecting terminal 42 is externally fitted to the takeout end of the output terminal 26, and a nut 44 is threadably attached to the external thread portion 26*b*. Then, the nut 44 is tightened so as to abut the other end of the metal bush 43 against the rear surface of the first cooling plate 22, thus fasteningly securing the connecting terminal 42 between the nut 44 and one end surface of the metal bush 43. In this case, one end surface of the metal bush 43 serves as a fastening seat.

Furthermore, a large-diameter flange 43*a* is provided on one end of the metal bush 43, an axial gap being provided between the other end surface of the flange 43*a* and the insulating bush 41. If the output terminal 26 is axially displaced, then the other end surface of the flange 43*a* abuts against the insulating bush 41 thereby to prevent any further axial displacement, thus making up an axial displacement restricting member.

In the automotive alternator constructed as set forth above, electric current is supplied from a battery (not shown) to the field coil 13 through the brushes 10 and the slip rings 9, producing magnetic fluxes. The claw-shaped magnetic poles 14*a* of the pole core 14 are magnetized into North-seeking (N) poles, while the claw-shaped magnetic poles 15*a* of the pole core 15 are magnetized into South-seeking (S) poles.

On the other hand, the pulley 4 is driven by an engine, and the rotor 7 is rotates by the shaft 6. The rotation of the rotor 7 causes a rotating magnetic field in the stator iron core 16, so that an electromotive force is generated in the stator winding 17. The AC electromotive force generated in the stator 8 is rectified into direct current by the rectifying unit 12, and the magnitude of the output voltage thereof is adjusted by the regulator 18. Then, the output of the rectifying unit 12 is charged into the battery via the output terminal 26 and the vehicular connecting terminal 42.

According to the first embodiment, the fastening force of the nut 44 is received by the rear surface of the first cooling plate 22 via the metal bush 43 constituting the fastening seat, permitting the fastening force for the vehicular connecting terminal 42 to be secured.

Moreover, if the output terminal 26 is axially displaced, the other end surface of the flange 43*a* of the metal bush 43 abuts against the insulating bush 41, thereby preventing further axial displacement of the output terminal 26. Therefore, even if the vibrations of a weight, such as a harness, from a vehicle is transmitted to the vehicular connecting terminal 42, the axial displacement of the output terminal 26 is restrained to protect the rectifying unit 12 from damage or the fastened portion of the mounting screw 40 from breakage.

When the automotive alternator generates power, large current passes the vehicular connecting terminal 42, generating heat. However, the gap formed between the metal bush 43 and the insulating bush 41 causes less heat to be conducted from the metal bush 43 to the insulating bush 41, thus controlling a rise in the temperature of the insulating bush 41. As a result, the thermal degradation of the insulating bush 41 can be restrained. This means that the shrinkage of the insulating bush 41 attributable to the thermal degradation of the insulating bush 41 is suppressed, and the axial displacement of the output terminal 26 is controlled to a predetermined range, leading to improved reliability.

In addition, since the insulating bush 41 is not involved in the fastening mechanism for the vehicular connecting terminal 42, the occurrence of the thermal shrinkage of the insulating bush 41 caused by thermal degradation will not lead to loosening of the vehicular connecting terminal 42. This will secure the fastening force for the vehicular connecting terminal 42 for a long time, with resultant higher reliability. An increase in the contact resistance produced between the vehicular connecting terminal 42 and the output terminal 26 attributable to the loosening of the vehicular connecting terminal 42 can be restrained, so that no significant heat generation will take place at the fastened portion of the connecting terminal 42, while significant heat generation used to take place in the conventional structure. In this aspect also, the thermal degradation of the insulating bush 41 can be suppressed. With this arrangement, the shrinkage of the insulating bush 41 resulting from the thermal degradation of the insulating bush 41 is controlled, so that the axial displacement of the output terminal 26 is limited to a predetermined range, leading to higher reliability.

Second Embodiment

Figure 4:
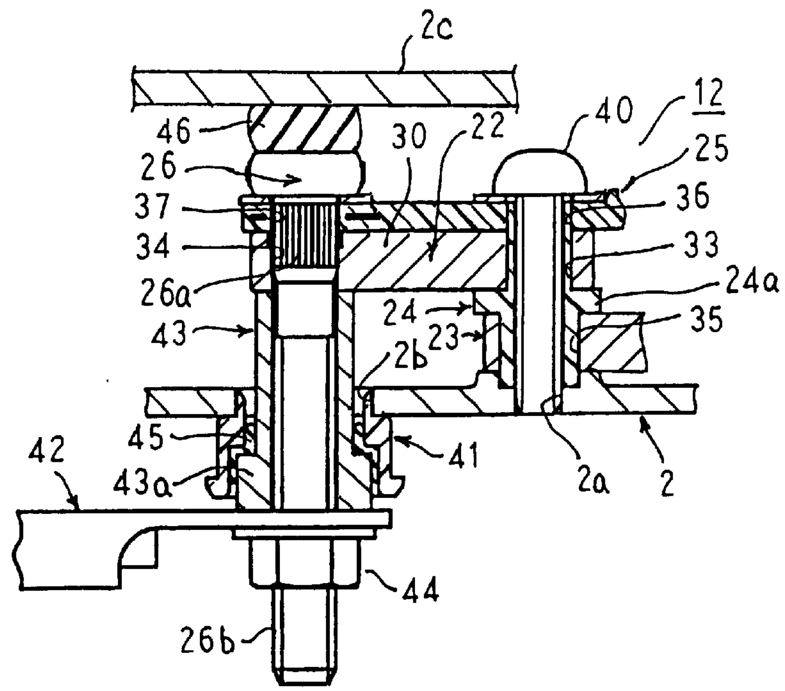
FIG. 4 is a sectional view of an essential section illustrating an output takeout structure in the automotive alternator according to a second embodiment of the present invention.

Referring to FIG. 4, in a second embodiment, an elastic member 45 composed of a silicone rubber or the like is interposed between an insulating bush 41 and a flange 43*a* of a metal bush 43, a support wall 2*c* is vertically provided outside the counter-takeout end of an output terminal 26 from the inner wall surface of a rear bracket 2, and an insulating member 46 formed of a phenol resin or the like is interposed between a counter-takeout end surface of the output terminal 26 and the support wall 2*c*. The rest of the construction of the second embodiment is the same as the construction of the first embodiment described above.

The second embodiment provides the advantage described below in addition to the advantage of the above first embodiment. Because of the presence of the elastic member 45 interposed between the insulating bush 41 and the flange 43*a* of the metal bush 43, even if the vibrations due to a weight, such as a harness, from a vehicle is transmitted to the vehicular connecting terminal 42, the stress applied to the rectifying unit 12 via the output terminal 26 will be absorbed by the elastic member 45. This arrangement makes it possible to protect the rectifying unit 12 from damage or the fastened portion of a mounting screw 40 from breakage attributable to the vibrations caused by a weight, such as a harness, from a vehicle.

Moreover, the presence of the insulating member 46 interposed between the support wall 2*c* vertically provided from the inner wall surface of the rear bracket 2 and the counter-takeout end surface of the output terminal 26 securely restrains the axial displacement of the output terminal 26 attributable to the vibrations caused by a weight, such as a harness, from the vehicle. This will securely prevents damage to the rectifying unit 12 or breakage of a fastened portion of a mounting screw 40.

Third Embodiment

Figure 5:
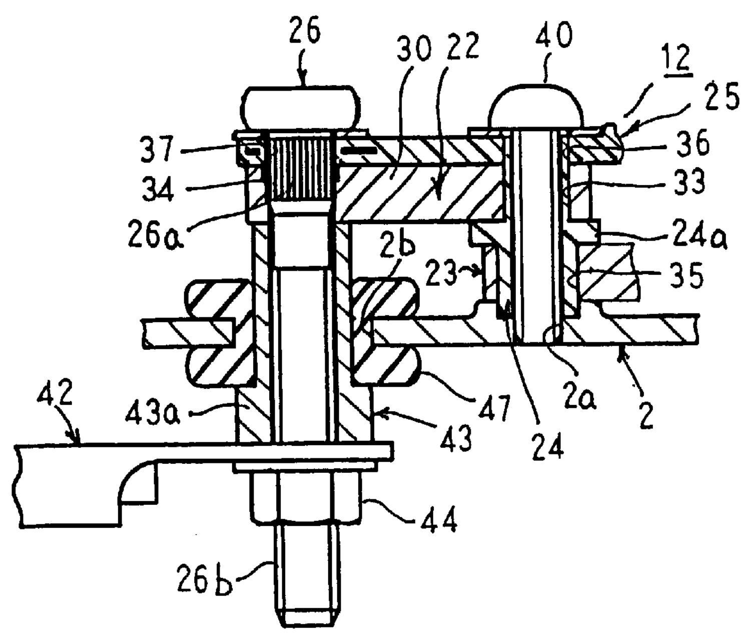
FIG. 5 is a sectional view of an essential section illustrating an output takeout structure in the automotive alternator according to a third embodiment of the present invention.

In a third embodiment shown in FIG. 5, an elastic member 47 composed of silicone rubber or the like is employed in place of the insulating bush 41. The elastic member 47 is installed at an opening 2*b* of a rear bracket 2 such that it abuts against the other end surface of a flange 43*a* of the metal bush 43. The rest of the construction of the third embodiment is the same as the construction of the first embodiment described above.

In the third embodiment, the axial displacement of an output terminal 26 is restricted by the elastic member 47, and the stress applied to a rectifying unit 12 via the output terminal 26 is absorbed by the elastic member 47. Thus, the third embodiment permits enhanced prevention of damage to the rectifying unit 12 or breakage of the fastened portion of a mounting screw 40, thus enabling higher reliability to be achieved.

Fourth Embodiment

Figure 6:
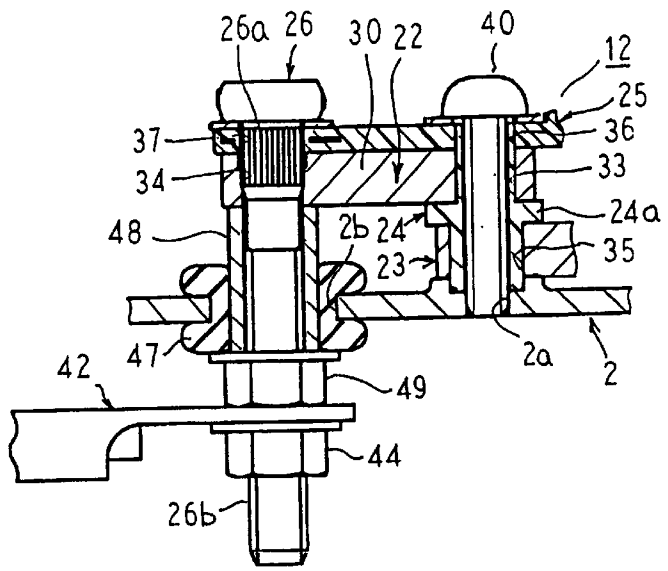
FIG. 6 is a sectional view of an essential section illustrating an output takeout structure in the automotive alternator according to a fourth embodiment of the present invention.

In a fourth embodiment shown in FIG. 6, a cylindrical metal bush 48 is used in place of the metal bush 43. The metal bush 48 is fasteningly secured to the rear surface of the first cooling plate 22 by a metal bush fastening nut 49. Furthermore, a vehicular connecting terminal 42 is fasteningly fixed to the outer end surface of the metal bush fastening nut 49 by a nut 44. The axial position restricting member is formed by the metal bush 48 and the metal bush fastening nut 49, the outer end surface of the metal bush fastening nut 49 constituting a fastening seat. The rest of the construction of the fourth embodiment is the same as the construction of the third embodiment set forth above.

In the fourth embodiment, the fastening force of the nut 44 is received by the rear surface of a first cooling plate 22 via the metal bush fastening nut 49 constituting the fastening seat and the metal bush 48. If an output terminal 26 is axially displaced, then the other end surface of the metal bush fastening nut 49 abuts against an elastic member 47 so as to prevent further axial displacement of the output terminal 26. Hence, the fourth embodiment provides the same advantage as that of the third embodiment.

Fifth Embodiment

Figure 7:
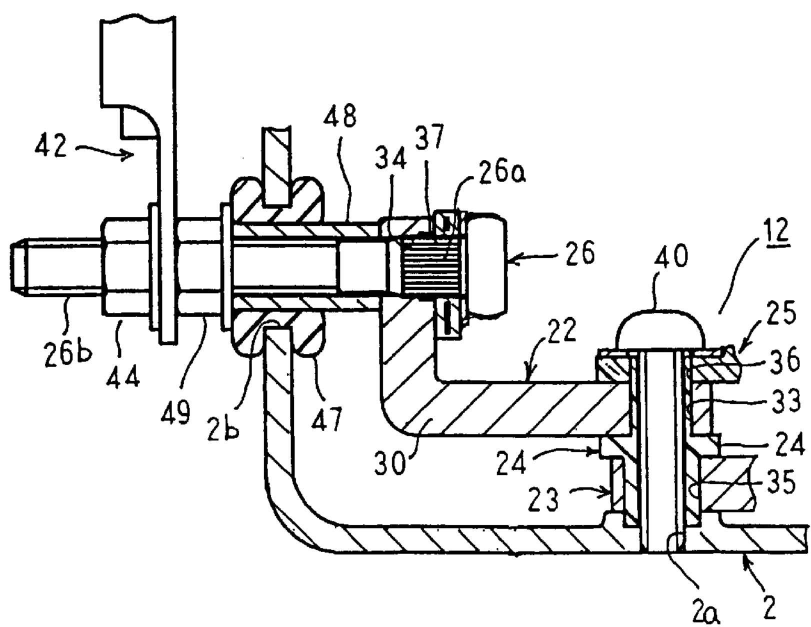
FIG. 7 is a sectional view of an essential section illustrating an output takeout structure in the automotive alternator according to a fifth embodiment of the present invention.

In the above fourth embodiment, the output terminal 26 is taken out in the axial direction of the automotive alternator. In a fifth embodiment, the circumferentially extended portion of a flange 30 of a first cooling plate 23 is bent into an L shape, and the output terminal 26 is taken out in the radial direction of the automotive alternator, as shown in FIG. 7, to provide the same advantage.

Sixth Embodiment

In a sixth embodiment shown in FIG. 8, a large-diameter flange 26*c* functioning as the axial displacement restricting member is formed at the proximal end of an external thread portion 26*b* of an output terminal 26A. The rest of the construction of the sixth embodiment is the same as the construction of the fourth embodiment set forth above.

In the sixth embodiment, a vehicular connecting terminal 42 is fasteningly secured to the outer end surface, i.e., the fastening seat, of the flange 26*c* by a nut 44. The inner end surface of the flange 26*c* abuts against an elastic member 47 to restrict the axial displacement of the output terminal 26A. Thus, the sixth embodiment provides the same advantage as that of the fourth embodiment, and permits reduced cost because it obviates the need for the metal bush 43.

Seventh Embodiment

Figure 9:
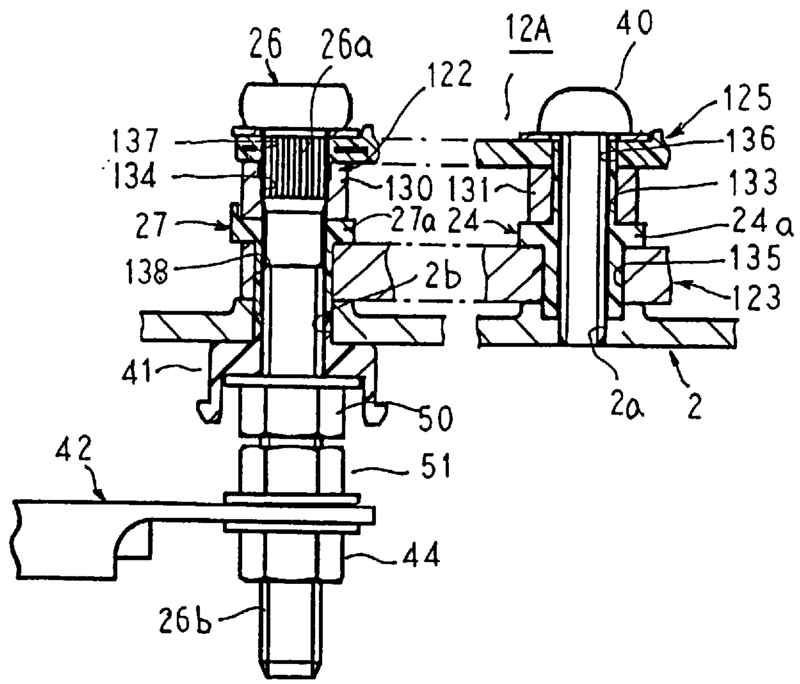
FIG. 9 is a sectional view of an essential section illustrating an output takeout structure in the automotive alternator according to a seventh embodiment of the present invention.

In a seventh embodiment shown in FIG. 9, a nut 51 serving as a fastening seat is threadably attached at a position spaced away from an output terminal fastening nut 50 of an external thread portion 26*b* of an output terminal 26, and a connecting terminal 42 is fasteningly secured to the nut 51 by a nut 44. The rest of the construction of the seventh embodiment is the same as the construction of the conventional example shown in FIG. 11 and FIG. 12.

In the assembly structure of a rectifying unit 12A according to the seventh embodiment, the nut 51 to which the connecting terminal 42 is fastened is spaced away from the output terminal fastening nut 50, and threadably attached to the external thread portion 26*b*. With this arrangement, even if an insulating bush 41 develops thermal degradation due to the heat generated at the connecting terminal 42, causing the output terminal fastening nut 50 to loosen, the connecting terminal 42 fastened by the nuts 44 and 51 will not loosen. As a result, significant heat generation caused by loosening of the fastened portion of the connecting terminal 42 is suppressed, so that the axial displacement of the output terminal 26 will not be expedited. Thus, as compared with the conventional example, there will be less chance of the occurrence of damage to the rectifying unit 120 or breakage of the fastened portion of the mounting screw 40 attributable to the vibrations due to a weight, such as a harness, from the vehicle. The result is higher reliability.

Furthermore, the fastening force of the nut 44 is received by the nut 51 spaced away from the output terminal fastening nut 50 that pushes an insulating bush 41. Hence, the vibrations due to a weight, such as a harness, from the vehicle are not directly applied to the insulating bush 41, making it possible to restrain the occurrence of the creep of the insulating bush 41.

Eighth Embodiment

Figure 10:
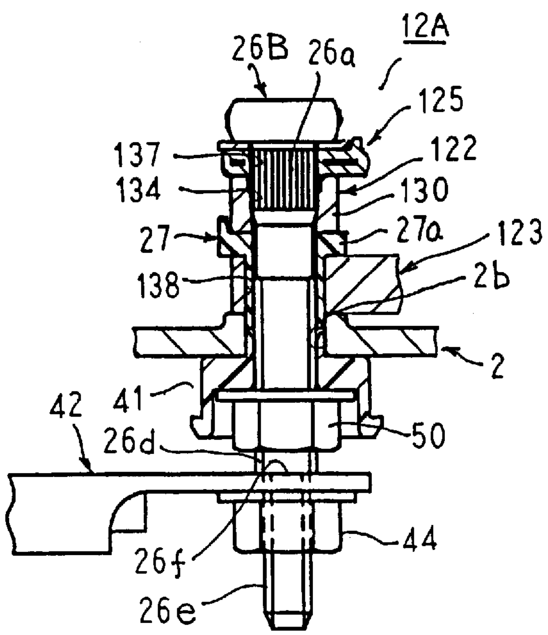
FIG. 10 is a sectional view of an essential section illustrating an output takeout structure in the automotive alternator according to an eighth embodiment of the present invention.
Figure 1:
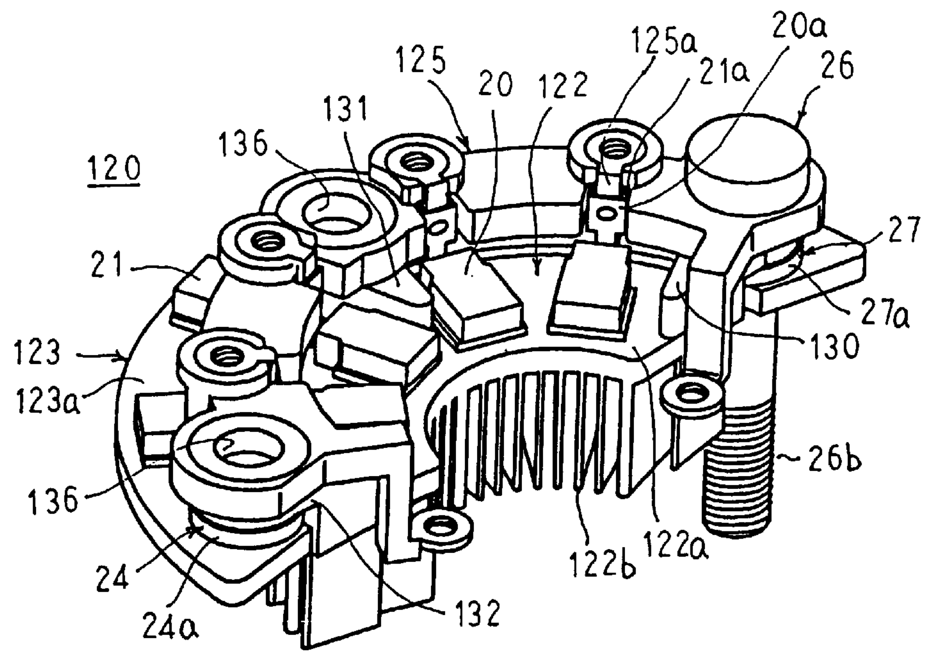
Figure 1:
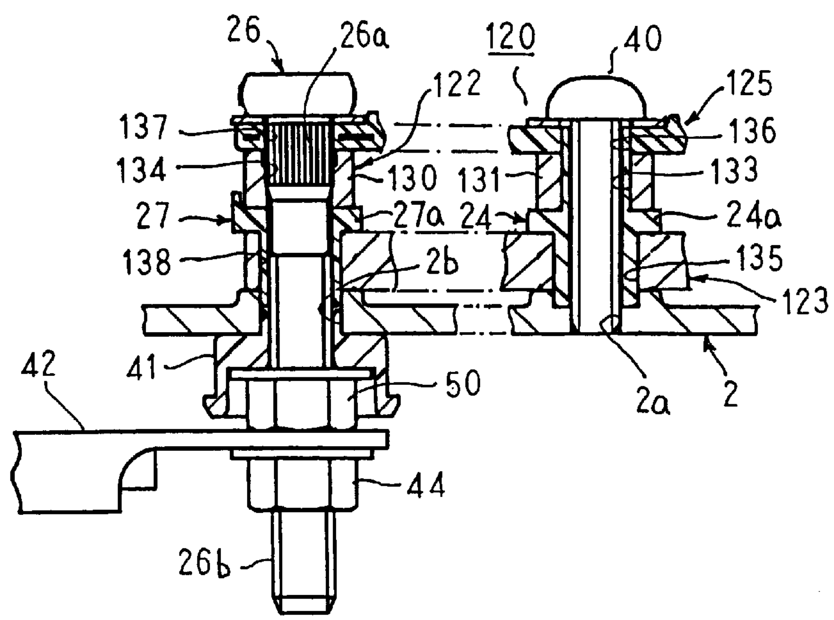

In an eighth embodiment, an output terminal 26B is employed in place of the output terminal 26. Referring to FIG. 10, the output terminal 226B has a first external thread portion 26*d* having a large diameter and a second external thread portion 26*e* having a small diameter, which are formed at the takeout end thereof. A stepped portion 26*f* formed at the joint of the external thread portions 26*d* and 26*e* constitutes a fastening seat. A connecting terminal 42 is fasteningly secured to the stepped portion 26*f* by a nut 44. The rest of the construction of the eighth embodiment is the same as the construction of the seventh embodiment set forth above.

In the assembly structure of a rectifying unit 12A according to the eighth embodiment, the stepped portion 26*f* to which the connecting terminal 42 is fasteningly secured is formed on the output terminal 26B, being spaced away from an output terminal fastening nut 50.

With this arrangement, even if an insulating bush 41 develops thermal degradation due to the heat generated at the connecting terminal 42, causing the output terminal fastening nut 50 to loosen, the connecting terminal 42 fastened by the nuts 44 will not loosen. In addition, the fastening force of the nut 44 is received by the stepped portion 26*f* spaced away from the output terminal fastening nut 50 pushing the insulating bush 41; therefore, the vibrations caused by a weight, such as a hardness, from the vehicle are not directly applied to the insulating bush 41.

Accordingly, the eighth embodiment provides the same advantage as that of the seventh embodiment set forth above.

In the embodiments described above, the output terminal 26 has been electrically connected to the first cooling plate 22, and the second cooling plate 23 has been electrically connected to the rear bracket 2. The same advantages, however, can be obtained when the output terminal 26 is electrically connected to the second cooling plate 23, and the first cooling plate 22 is electrically connected to the rear bracket 2.

In the first through fifth embodiments discussed above, the metal bush has been used as the axial displacement restricting member. The bush, however, is not limited to a metal one; it may alternatively be a ceramic bush.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

This automotive alternator of the present invention is constituted as described above. Thus, this automotive alternator has the following effects.

To these ends, according to one aspect of the present invention, there is provided an automotive alternator including a rotor rotatably supported in a metal bracket, a stator secured to the bracket such that it is located around the outer periphery of the rotor to surround the rotor, a rectifying unit having a first cooling plate on which a plurality of first diodes are provided, and a second cooling plate on which a plurality of second diodes of the opposite polarity from that of the first diodes are provided, the second cooling plate being electrically connected to the bracket, and the first and second cooling plates being secured to an inner wall surface of the bracket, a resinous insulating bush mounted at an opening provided in the bracket, an output terminal which is electrically connected to the first cooling plate, loosely inserted in the insulating bush, and taken out of the bracket, a vehicular connecting terminal being connected to the takeout end of the output terminal, an axial displacement restricting member which engages the insulating bush thereby to restrict the axial displacement of the output terminal, and constitutes a fastening seat, and an external thread portion provided on the takeout end of the output terminal, wherein the counter-takeout end of the output terminal is secured to the first cooling plate, and the vehicular connecting terminal is fasteningly secured to the fastening seat of the axial displacement restricting member by a nut threadably attached to the external thread portion. With this arrangement, the fastening force for the vehicular connecting terminal can be secured for an extended period of time, marked heat generation attributable to the loosening of the fastened vehicular connecting terminal can be restrained, and the axial displacement of the output terminal can be restrained, allowing an automotive alternator featuring high reliability to be achieved.

Preferably, an elastic member is interposed between the axial displacement restricting member and the insulating bush. With this arrangement, the vibrations transmitted to the output terminal via the vehicular connecting terminal are absorbed by the elastic member, thus minimizing the chance of damage to the rectifying unit.

Preferably, the insulating bush is mounted at the opening of the bracket such that it is abutted against the axial displacement restricting member, and the insulating bush is formed of an elastic material. With this arrangement, the vibrations transmitted to the output terminal via the vehicular connecting terminal are absorbed by the insulating bush, thus minimizing the chance of damage to the rectifying unit.

Alternatively, the axial displacement restricting member is externally fitted to the output terminal, and composed of a cylindrical metal bush having a flange of a large diameter on one end thereof, one end surface of the metal bush abuts against the vehicular connecting terminal, and the other end surface thereof abuts against the first cooling plate, and the flange thereof engages the insulating bush to restrain the axial displacement of the output terminal when the vehicular connecting terminal is connected to the takeout end of the output terminal. This arrangement secures the fastening force for the vehicular connecting terminal for an extended period of time, and also restrains the axial displacement of the output terminal.

Alternatively, the axial displacement restricting member is constructed by a metal bush fastening nut threadably attached to the external thread portion of the output terminal, a cylindrical metal bush which is externally fitted to the output terminal and fasteningly secured to the first cooling plate by the metal bush fastening nut, the vehicular connecting terminal is fasteningly secured to the outer end surface of the metal bush fastening nut by the nut threadably attached to the external thread portion, and the inner end surface of the metal bush fastening nut engages the insulating bush thereby to restrain the axial displacement of the output terminal. This arrangement secures the fastening force for the vehicular connecting terminal for an extended period of time, and also restrains the axial displacement of the output terminal.

Preferably, the axial displacement restricting member is constituted by a large-diameter flange formed at the proximal end of the external thread portion of the output terminal, the vehicular connecting terminal is fasteningly secured to the outer end surface of the flange by the nut threadably attached to the external thread portion, and the inner end surface of the flange engages the insulating bush thereby to restrain the axial displacement of the output terminal. With this arrangement, the axial displacement restricting member can be accomplished using a simple construction.

Preferably, a support wall is vertically provided such that it opposes the counter-takeout end surface of the output terminal, and an insulating member is interposed between the support wall and the counter-takeout end surface of the output terminal. This arrangement securely suppresses the axial displacement of the output terminal.

According to another aspect of the present invention, there is provided an automotive alternator including a rotor rotatably supported in a metal bracket, a stator secured to the bracket such that it is located around the outer periphery of the rotor to surround the rotor, a rectifying unit having a first cooling plate on which a plurality of first diodes are provided, and a second cooling plate on which a plurality of second diodes of the opposite polarity from that of the first diodes are provided, the second cooling plate being electrically connected to the bracket, and the first and second cooling plates being secured to an inner wall surface of the bracket, a resinous insulating bush mounted at an opening provided in the bracket, an output terminal which is electrically connected to the first cooling plate, loosely inserted in the insulating bush, and taken out of the bracket, a vehicular connecting terminal being connected to the takeout end of the output terminal, through holes which are provided in the first and second cooling plates and in which the output terminal is inserted, an external thread portion provided on the takeout end of the output terminal, an output terminal fastening nut threadably attached to the external thread portion to fasteningly secure the output terminal to the bracket, and a fastening seat provided at a position different from that of the output terminal fastening nut on the takeout end of the output terminal, wherein the counter-takeout end of the output terminal is inserted in the through holes of the first and second cooling plates and secured to the first cooling plate, the first and second cooling plates are secured together with the insulating bush to the bracket by the output terminal fastening nut, and the vehicular connecting terminal is fasteningly secured to the fastening seat by a nut threadably attached to the external thread portion. With this arrangement, the fastening force for the vehicular connecting terminal can be secured for an extended period of time, and marked heat generation attributable to the loosening of the fastened vehicular connecting terminal can be restrained, allowing an automotive alternator featuring high reliability to be achieved.

Preferably, the external thread portion of the output terminal is composed of a first external thread portion having a large diameter to which the output terminal fastening nut is threadably attached and a second external thread portion having a small diameter which is continuously formed at the takeout end of the first external thread portion and to which the nut is threadably attached, and a stepped portion formed in the area, where the first and the second external thread portions are connected, constitutes the fastening seat. The arrangement secures the fastening force for the vehicular connecting terminal for an extended period of time.

What is claimed is:

1. An automotive alternator comprising:

a rotor rotatably supported in a metal bracket;

a stator secured to the bracket such that it is located around the outer periphery of the rotor to surround the rotor;

a rectifying unit having a first cooling plate on which a plurality of first diodes are provided, and a second cooling plate on which a plurality of second diodes of the opposite polarity from that of the first diodes are provided, the second cooling plate being electrically connected to the bracket, and the first and second cooling plates being secured to an inner wall surface of the bracket;

a resinous insulating bush mounted at an opening provided in the bracket;

an output terminal which is electrically connected to the first cooling plate, loosely inserted in the insulating bush, and taken out of the bracket, a vehicular connecting terminal being connected to the takeout end of the output terminal;

an axial displacement restricting member which engages the insulating bush thereby to restrict the axial displacement of the output terminal and constitutes a fastening seat; and an external thread portion provided on the takeout end of the output terminal, wherein the counter takeout-end of the output terminal is secured to the first cooling plate, and the vehicular connecting terminal is fasteningly secured to the fastening seat of the axial displacement restricting member by a nut threadably attached to the external thread portion, wherein the axial displacement restricting member is constituted by a large-diameter flange formed at the proximal end of the external thread portion of the output terminal, wherein the vehicular connecting terminal is fasteningly secured to the outer end surface of the flange by the nut threadably attached to the external thread portion, and wherein the inner end surface of the flange engages the insulating bush thereby to restrain the axial displacement of the output terminal.

2. The automotive alternator according to claim 1, wherein an elastic member is interposed between the axial displacement restricting member and the insulating bush.

3. The automotive alternator according to claim 1, wherein the insulating bush is mounted at the opening of the bracket such that it is abutted against the axial displacement restricting member, and the insulating bush is formed of an elastic material.

4. The automotive alternator according to claim 1, wherein a support wall is vertically provided such that it opposes the counter-takeout end surface of the output terminal, and an insulating member is interposed between the support wall and the counter-takeout end surface of the output terminal.

* * * * *